US010790991B2

(12) United States Patent
Bos et al.

(10) Patent No.: US 10,790,991 B2
(45) Date of Patent: Sep. 29, 2020

(54) DETERMINISTIC DIGITAL SIGNATURE METHOD WITHOUT USING A HASH FUNCTION

(71) Applicant: NXP B.V., Eindhoven (NL)

(72) Inventors: Joppe Willem Bos, Wijgmaal (BE); Florian Boehl, Leuven (BE)

(73) Assignee: NXP B.V., Eindhoven (NL)

( * ) Notice: Subject to any disclaimer, the term of this patent is extended or adjusted under 35 U.S.C. 154(b) by 212 days.

(21) Appl. No.: 16/117,714

(22) Filed: Aug. 30, 2018

(65) Prior Publication Data

US 2020/0076616 A1  Mar. 5, 2020

(51) Int. Cl.
*H04L 9/32* (2006.01)
*H04L 9/08* (2006.01)
*H04L 9/06* (2006.01)

(52) U.S. Cl.
CPC .......... *H04L 9/3252* (2013.01); *H04L 9/0618* (2013.01); *H04L 9/0869* (2013.01); *H04L 2209/16* (2013.01)

(58) Field of Classification Search
CPC . H04L 2209/16; H04L 9/0618; H04L 9/0643; H04L 9/0869; H04L 9/3252
See application file for complete search history.

(56) References Cited

U.S. PATENT DOCUMENTS

| 2012/0002807 | A1* | 1/2012 | Michiels | H04L 9/0631 380/28 |
| 2014/0258736 | A1* | 9/2014 | Merchan | G06F 21/62 713/193 |
| 2015/0172050 | A1* | 6/2015 | Teuwen | G06F 7/588 380/255 |
| 2015/0350171 | A1* | 12/2015 | Brumley | H04L 9/3247 713/170 |
| 2016/0080144 | A1* | 3/2016 | Choi | H04L 9/0637 380/44 |
| 2018/0165454 | A1* | 6/2018 | Anderson | G06F 21/125 |
| 2018/0262343 | A1* | 9/2018 | Chabanne | G06F 7/723 |
| 2018/0302382 | A1* | 10/2018 | Lehmann | H04W 12/02 |
| 2018/0338244 | A1* | 11/2018 | Singhal | H04W 48/00 |
| 2019/0081797 | A1* | 3/2019 | Bos | H04L 9/3066 |
| 2020/0044837 | A1* | 2/2020 | Bos | H04L 9/0618 |

OTHER PUBLICATIONS

Request for Comment (RFC): 6979, "Deterministic Usage of the Digital Signature Algorithm (DSA) and Elliptic Curve Digital Signature Algorithm (ECDSA)" (T. Pornin, Aug. 2013).*
C. P. Schnorr, "Efficient Identification and Signatures for Smart Cards", Advances in Cryptology—CRYPTO '89, LNCS 435, pp. 239-252 (1990).

(Continued)

*Primary Examiner* — Joseph P Hirl
*Assistant Examiner* — Sayed Aresh Beheshti Shirazi

(57) ABSTRACT

A white-box system and method for producing a digital signature of a message m, including: a white-box implementation of a symmetric cipher configured to produce a deterministic nonce value by encrypting the message m using a secret key; and a digital signature algorithm configured to produce a digital signature of the message m based upon the deterministic nonce, the message m, and a secret signing key.

18 Claims, 1 Drawing Sheet

(56) References Cited

OTHER PUBLICATIONS

N. Koblitz, "Elliptic Curve Cryptosystems", Mathematics of Computation, vol. 48, No. 177, pp. 203-209 (1987).
S. Chow, et al. "Whitebox Cryptography and an AES Implementation", Selected Areas in Cryptography—SAC 2002, vol. 2595, Springer, pp. 250-270 (2003).
S. Chow, et al. "A White-Box DES Implementation for DRM Applications", Digital Rights Management—DRM 2002 (Joan Feigenbaum, ed.), vol. 2696, Springer, pp. 1-15 (2003).
U.S. Department of Commerce/National Institute of Standards and Technology, Digital Signature Standard (DSS), FIPS-186-4, 2013, http://nvlpubs.nist.gov/nistpubs/FIPS/NIST.FIP.
V. S. Miller, Use of Elliptic Curves in Cryptography, Crypto 1985 (Hugh C. Williams, ed.), Lecture Notes in Computer Science, vol. 218, pp. 417-426 (1986).

* cited by examiner

DETERMINISTIC DIGITAL SIGNATURE METHOD WITHOUT USING A HASH FUNCTION

TECHNICAL FIELD

Various exemplary embodiments disclosed herein relate generally to a deterministic digital signature method without using a hash function.

BACKGROUND

The digital signature algorithm (DSA) is a standardized digital signature scheme based on modular exponentiation. The elliptic curve digital signature algorithm (ECDSA) ECDSA is a standardized digital signature scheme based on elliptic curves. To sign a message with DSA or ECDSA, the signer must pick a random value that must not be re-used for signing any other message. If the same random value is used to sign two different messages, the secret signing key can be efficiently computed from the two messages and their signatures.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a white-box system for producing a digital signature of a message m, including: a white-box implementation of a symmetric cipher configured to produce a deterministic nonce value by encrypting the message m using a secret key; and a digital signature algorithm configured to produce a digital signature of the message m based upon the deterministic nonce, the message m, and a secret signing key.

Various embodiments are described, wherein the digital signature algorithm is an elliptic curve digital signature algorithm as defined in NIST FIPS 186-4.

Various embodiments are described, wherein the digital signature algorithm is a digital signature algorithm based upon modular exponentiation as defined in NIST FIPS 186-4.

Various embodiments are described, wherein white-box implementation of the symmetric cipher is a static implementation incorporating the secret key.

Various embodiments are described, wherein white-box implementation of the symmetric cipher is a dynamic implementation configured to receive the secret key as an input.

Various embodiments are described, wherein the white-box implementation of the symmetric cipher is bound to a specific platform.

Various embodiments are described, wherein the secret key is randomly generated off line.

Various embodiments are described, wherein the secret key is derived from the secret signing key.

Various embodiments are described, wherein the digital signature algorithm is combined with the white-box implementation of the symmetric cipher.

Further various embodiments relate to a method for producing a digital signature of a message m using a white-box implementation, including: producing a deterministic nonce value by encrypting the message m using a secret key using a white-box implementation of a symmetric cipher; and producing a digital signature of the message m based upon the deterministic nonce, the message m, and a secret signing key.

Various embodiments are described, wherein the digital signature algorithm is an elliptic curve digital signature algorithm as defined in NIST FIPS 186-4.

Various embodiments are described, wherein the digital signature algorithm is a digital signature algorithm based upon modular exponentiation as defined in NIST FIPS 186-4.

Various embodiments are described, wherein white-box implementation of the symmetric cipher is a static implementation incorporating the secret key.

Various embodiments are described, wherein white-box implementation of the symmetric cipher is a dynamic implementation configured to receive the secret key as an input.

Various embodiments are described, wherein the white-box implementation of the symmetric cipher is bound to a specific platform.

Various embodiments are described, further including generating the secret key randomly off line.

Various embodiments are described, wherein further including deriving the secret key from the secret signing key.

Various embodiments are described, wherein the digital signature algorithm is combined with the white-box implementation of the symmetric cipher.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
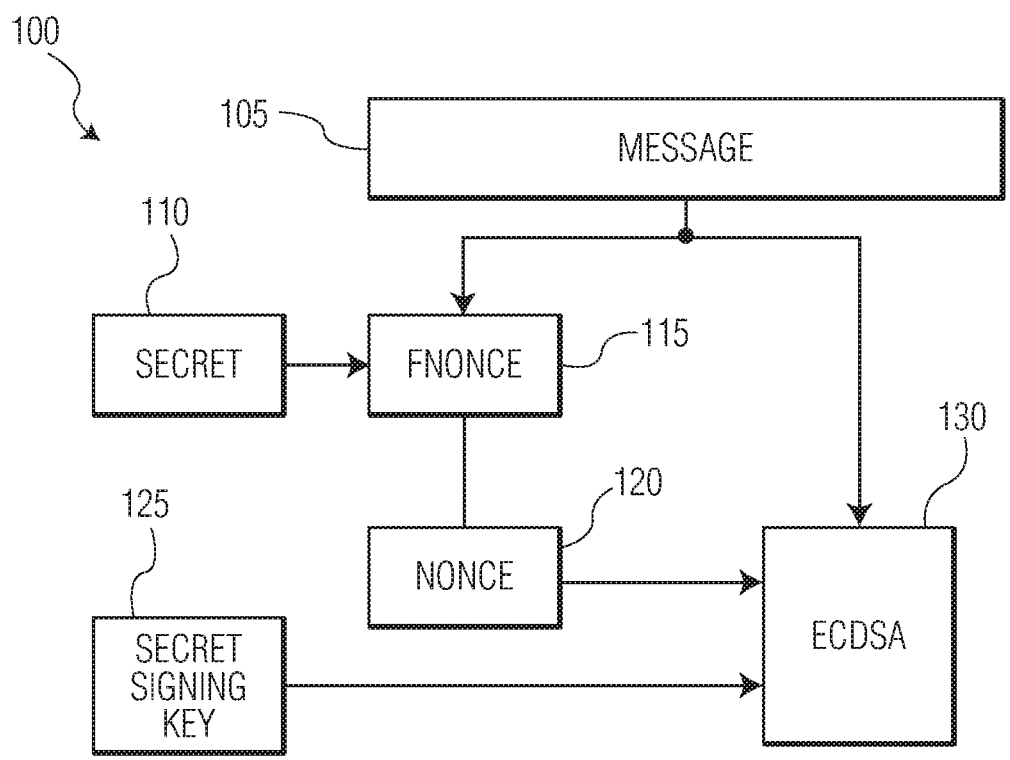
FIG. 1 illustrates white-box implementation of securely calculating a deterministic nonce value.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

ECDSA is a standardized digital signature scheme based on elliptic curves as defined by the National Institute of Standards and Technology (NIST) standard NIST FIPS 186-4. DSA is a standardized digital signature scheme based on modular exponentiation as defined by the NIST standard NIST FIPS 186-4. To sign a message with ECDSA or DSA, the signer must pick a random value that must not be re-used for signing any other message. If the same random value is used to sign two different messages, the secret signing key can be efficiently computed from the two messages and their signatures. This is a problem if the signer does not have access to a reliable source of cryptographically strong entropy. For this reason, a deterministic variant of DSA and ECDSA has been devised which computes a hash over the message and the secret signing key and uses the output as a "random" value. Now, for two messages to share the same random value, a hash collision must occur which the security of the hash function excludes. An embodiment of an alternative construction for a deterministic DSA or ECDSA variant based on symmetric cryptography is described herein. This embodiment does not require computing any hash function, but uses a white-box crypto implementation of a symmetric cipher instead. This has the advantage of creating practical implementations of DSA and ECDSA in the white-box attack model.

DSA and ECDSA will now be described. Given a cryptographic hash function $\mathcal{H}$ and a message $m \in \mathbb{Z}$ the DSA signature generation is computed as follows. The DSA algorithm uses the domain parameters $(p, q, g)$, where $p$ and $q$ are prime such that $q$ divides $p-1$ and $g \in [1, p-1]$ has order $q$, and a private key $d \in \mathbb{Z}/q\mathbb{Z}$. The DSA algorithm outputs the signature $(r, s)$ as follows:

```
 1:  function DSA_sign(m, d, {p, q, g})
 2:      Compute e = 𝓗 (m)
 3:      repeat
 4:          repeat
 5:              Select u ∈_R [1, q - 1]
 6:              Compute T = g^u mod p
 7:              Compute r = T mod q
 8:          until r ≠ 0
 9:          Compute s = u^-1(e + dr) mod q
10:      until s ≠ 0
11:      return (r, s)
```

Given a cryptographic hash function $\mathcal{H}$ and a message $m \in \mathbb{Z}$ the ECDSA signature generation is computed as follows. The ECDSA algorithm uses a public point $P \in E(\mathbb{F}_p)$ of order $n \in \mathbb{Z}$, and a private key $d \in \mathbb{Z}/n\mathbb{Z}$. The ECDSA algorithm outputs the signature $(r, s)$ as follows:

```
 1:  function ECDSA_sign(m, d, {P, n})
 2:      Compute e = 𝓗 (m)
 3:      repeat
 4:          repeat
 5:              Select u ∈_R [1, n - 1]
 6:              Compute uP = (x, y)
 7:              Compute r = x mod n
 8:          until r ≠ 0
 9:          Compute s = u^-1(e + dr) mod n
10:      until s ≠ 0
11:      return (r, s)
```

Generating digital signatures is one of the corner stones of the modern security infrastructure. One of the standardized and popular approaches is based on the algebraic structure of elliptic curves over finite fields. One of the key features of elliptic curve cryptography (ECC) is the significantly smaller key-sizes to, for instance, asymmetric cryptographic systems based on RSA.

Let $\mathbb{F}_p$ denote a finite field of prime cardinality $p>3$. Any $a, b \in \mathbb{F}_p$ with $4a^3+27b^2 \neq 0$ define an elliptic curve $E_{a,b}$ over $\mathbb{F}_p$. The group of points $E_{a,b}(\mathbb{F}_p)$ of $E_{a,b}$ over $\mathbb{F}_p$ is defined as the zero point $\infty$ along with the set of pairs $(x,y) \in \mathbb{F}_p \times \mathbb{F}_p$ that satisfy the short Weierstrass equation $$y^2 = x^3 + ax + b. \quad (1)$$

Computing digital signatures using the multiplicative structure of finite fields using DSA is shown above. Using the ECDSA variant which uses the additive structure of elliptic curves is described above. This is the elliptic curve variant of the digital signature algorithm as standardized by the national institute of standards and technology.

In step 5 of both DSA and ECDSA the value u is sampled at random, and this u is called the per-message secret and has the same security requirements as the secret key d. If u is known to an attacker one can compute the secret key d since $$d = r^{-1}(us - e) \bmod n, \quad (2)$$

and all the r, s, e, and n are all publicly known. Moreover, this random value of u should be used only once. If used twice to generate signatures of two different messages $m_1$ and $m_2$ then one can compute this secret value U. Given two signatures which are signed with the same value of u: $(r, s_1)$ and $(r, s_2)$. Then $$u \equiv (s_1 - s_2)^{-1}(e_1 - e_2) \pmod{n}$$

where $e_1 = \mathcal{H}(m_1)$ and $e_2 = \mathcal{H}(m_2)$, and it is assumed that $s_1 - s_2 \not\equiv 0 \pmod{n}$. After u has been computed the secret key can be retrieved using equation (2).

There are methods known about how to turn such a digital signature using random-nonces into a deterministic signature scheme. Typically, a cryptographic hash function is used to compute the nonce based on the message to be signed together with material derived from the secret key material to deterministically create a nonce value for a particular message value.

Now implementing DSA or ECDSA using white-box cryptography will be described. White-box cryptography is aimed at protecting secret keys from being disclosed in a software implementation of a cryptographic function. In such a context, it is assumed that the attacker (usually a "legitimate" user or malicious software) may also control the execution environment. Such a user can examine the values being computed at any step of the function, and thus may be able to obtain secret information used in the cryptographic function. This is in contrast with the more traditional security model where the attacker is only given a black-box access (i.e., inputs/outputs) to the cryptographic function under consideration.

The main idea of white-box implementations is to rewrite a key-instantiated version so that all information related to the key is "hidden". In other words, for each secret key, a key-customized white-box implementation of the software is implemented so that the key input is unnecessary. Other white-box implementations allow for some sort of input to be used to allow for different secret keys to be used in a single white-box implementation.

Most symmetric block-ciphers, including the AES and the DES, are implemented using substitution boxes and linear transformations. Imagine that such a cipher is white-box implemented as a huge lookup table taking on input any plaintext and returning the corresponding ciphertext for a given key. Observe that this white-box implementation has exactly the same security as the same cipher in the black-box context: the adversary learns nothing more than pairs of matching plaintexts/ciphertexts. Typical plaintexts being 64-bit or 128-bit values, such an ideal approach cannot be implemented in practice.

Current white-box implementations apply the above basic idea to smaller components of the cryptographic function. They may represent each component as a series of lookup tables and insert random input and output bijective encodings to the lookup tables to introduce ambiguity, so that the resulting algorithm appears as the composition of a series of lookup tables with randomized values.

Creating a white-box digital signature implementation that is secure is challenging. One of the reasons is that the adversary can control or influence the random nonce selection which leads to extraction of the private key. On possible solution discussed above is to use deterministic signature schemes. These deterministic signature schemes often derive the nonce deterministically from the message and the private key used with the help of a cryptographic hash function. However, implementing the hash computation of the private key securely in the white-box attack model is a challenging and open problem. This is one of the main obstacles to creating a white-box implementation of a secure digital signature scheme that is secure in the white-box attack model.

An embodiment will be described that overcomes the stated problem by using a symmetric cipher instead of a cryptographic hash function to derive the nonce value deterministically. The secret key needed by this symmetric cipher is protected by a white-box implementation of this cipher. This raises the bar of the nonce generation while this also adds additional security features such as platform binding.

In order to move away from using randomized nonces to deterministic nonces based on the input message, one needs to use some secret key material because the exact nonce value should not be known to the adversary even when the input message is public. The conventional way of achieving this is by using a cryptographic hash function where the input message together with the secret key of the signature scheme $k_{(ec)dsa}$ (plus optionally some other auxiliary information) is used to create this nonce value. The main problem with this approach is that computing the hash function on the secret key material is difficult to do in the white-box attack model.

FIG. 1 illustrates white-box implementation of securely calculating a deterministic nonce value. A keyed function FNONCE 115 which uses a secret key value $k_{fnonce}$ 110 together with the input message 105 to deterministically compute the nonce value 120. In other words, the nonce is an encryption of the message 105 using the secret key value $k_{fnonce}$ 110, which is deterministic based upon the inputs. The keyed function FNONCE 115 may be a symmetric cipher which may be implemented efficiently and securely in the white-box attack model. Examples white-box implementations of symmetric ciphers include (3)DES and AES. There are multiple options how to implement the function FNONCE 115. The (EC)DSA 130 generates a digital signature of the message 105 using the nonce value 120 and secret signature key $k_{(ec)dsa}$ 125.

The key $k_{fnonce}$ 110 may be generated offline at random or could depend on the or be derived from the secret signature key $k_{(ec)dsa}$ 125.

The white-box implementation could either be static, i.e., where the key $k_{fnonce}$ 110 is integrated in the white-box implementation of FNONCE 115 itself, or dynamic, i.e., where the implementation is a pair (WB, Enc($k_{fnonce}$)) where WB is a dynamic white-box implementation of the symmetric cipher and Enc is an encoding function which protects the value of the key and allows for different key values to be used.

The advantages of this embodiment of are that modifications of the symmetric white-box cipher FNONCE 115 are assumed to be close to impossible. The implementation of FNONCE 115 and the (EC)DSA algorithm 130 may be merged into one executable and one single large function such that an adversary cannot easily distinguish between the two functionalities.

Moreover, this public-key approach can inherit other known security features from the white-box symmetric implementation used: for instance, platform binding offered by the symmetric implementation will automatically also hold for this extended public key algorithm, which makes use of the integrated symmetric white-box implementation for the nonce-generation. Platform binding seeks to bind the white-box to a specific platform to prevent and adversary from simply copying the white-box implementation and using it on other platforms. White-box implementations using platform binding will not properly operate when copied to another platform, thus preventing an attacker from improperly using the DSA or ECDSA.

It is noted that the embodiments described herein may be applied to any digital signature scheme that needs a random nonce.

The embodiments described herein solve the technological problem of implementing a digital signature scheme using a white-box implementation. This is accomplished by using a white-box implementation of symmetric cipher to generate a nonce based upon a secret key and the input message. The white-box implementation of the symmetric cipher may use other white-box implementation techniques to make it harder for an attacker to attack the digital signature scheme such as using platform binding.

Figure 2:
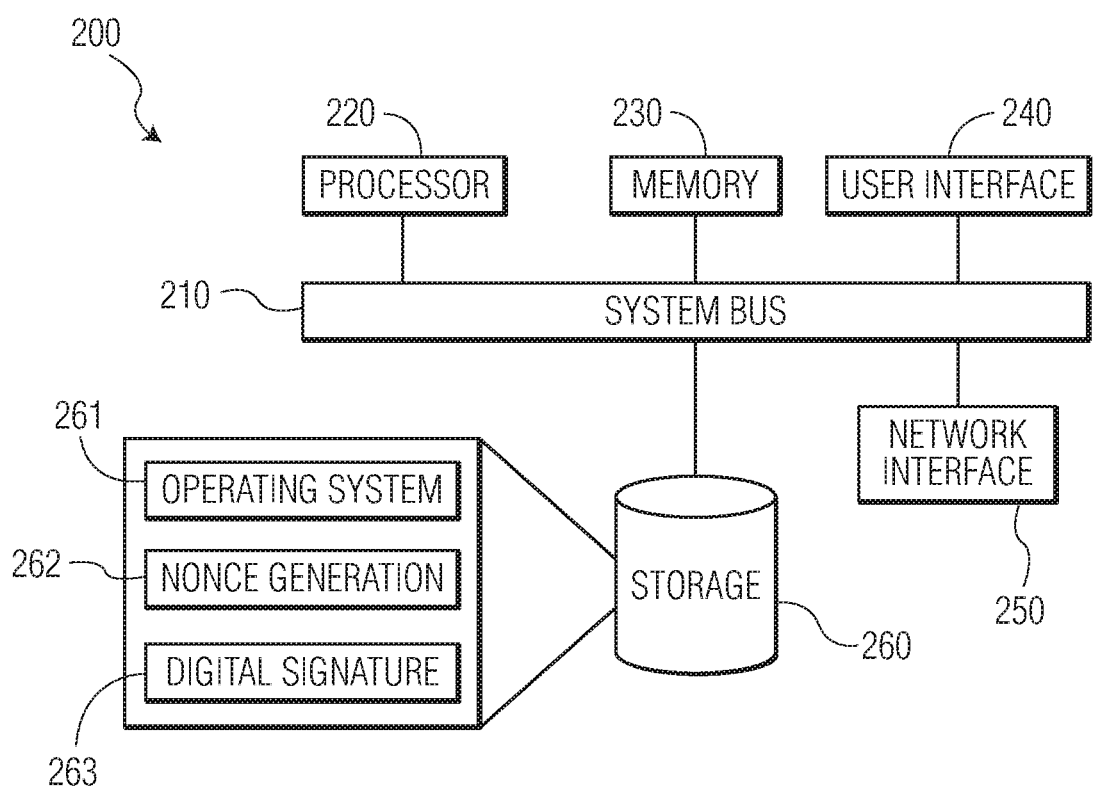
FIG. 2 illustrates an exemplary hardware diagram for implementing a cryptosystem according to the embodiments described herein.

FIG. 2 illustrates an exemplary hardware diagram 200 for implementing the embodiments for generating nonces and digital signatures described above. As shown, the device 200 includes a processor 220, memory 230, user interface 240, network interface 250, and storage 260 interconnected via one or more system buses 210. It will be understood that FIG. 2 constitutes, in some respects, an abstraction and that the actual organization of the components of the device 200 may be more complex than illustrated.

The processor 220 may be any hardware device capable of executing instructions stored in memory 230 or storage 260 or otherwise processing data. As such, the processor may include a microprocessor, field programmable gate array (FPGA), application-specific integrated circuit (ASIC), or other similar devices.

The memory 230 may include various memories such as, for example L1, L2, or L3 cache or system memory. As such, the memory 230 may include static random-access memory (SRAM), dynamic RAM (DRAM), flash memory, read only memory (ROM), or other similar memory devices.

The user interface 240 may include one or more devices for enabling communication with a user such as an administrator. For example, the user interface 240 may include a display, a mouse, and a keyboard for receiving user commands. In some embodiments, the user interface 240 may include a command line interface or graphical user interface that may be presented to a remote terminal via the network interface 250. In some embodiments, no user interface may be present.

The network interface 250 may include one or more devices for enabling communication with other hardware devices. For example, the network interface 250 may include a network interface card (NIC) configured to communicate according to the Ethernet protocol. Additionally, the network interface 250 may implement a TCP/IP stack for communication according to the TCP/IP protocols. Various alternative or additional hardware or configurations for the network interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon with the processor 220 may operate. For example, the storage 260 may store a base operating system 261 for controlling various basic operations of the hardware 200. Further, software for producing a nonce 262 and signing a message 263 may be stored in the memory. Also, a discussed above, the software for producing the nonce and the digital signature my be a single white-box implementation of these functions.

It will be apparent that various information described as stored in the storage 260 may be additionally or alternatively stored in the memory 230. In this respect, the memory 230 may also be considered to constitute a "storage device" and the storage 260 may be considered a "memory." Various other arrangements will be apparent. Further, the memory 230 and storage 260 may both be considered to be "non-transitory machine-readable media." As used herein, the term "non-transitory" will be understood to exclude transitory signals but to include all forms of storage, including both volatile and non-volatile memories.

While the host device 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. Further, where the device 200 is implemented in a cloud computing system, the various hardware components may belong to separate physical systems. For example, the processor 220 may include a first processor in a first server and a second processor in a second server.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A white-box system for producing a digital signature of a message m, comprising:

a white-box implementation of a symmetric cipher configured to produce a deterministic nonce value without using a hash function by encrypting the message m using a secret key; and a digital signature algorithm configured to produce a digital signature of the message m based upon the deterministic nonce value, the message m, and a secret signing key.

2. The white-box system of claim 1, wherein the digital signature algorithm is an elliptic curve digital signature algorithm as defined in NIST FIPS 186-4.

3. The white-box system of claim 1, wherein the digital signature algorithm is a digital signature algorithm based upon modular exponentiation as defined in NIST FIPS 186-4.

4. The white-box system of claim 1, wherein white-box implementation of the symmetric cipher is a static implementation incorporating the secret key.

5. The white-box system of claim 1, wherein white-box implementation of the symmetric cipher is a dynamic implementation configured to receive the secret key as an input.

6. The white-box system of claim 1, wherein the white-box implementation of the symmetric cipher is bound to a specific platform.

7. The white-box system of claim 1, wherein the secret key is randomly generated off line.

8. The white-box system of claim 1, wherein the secret key is derived from the secret signing key.

9. The white-box system of claim 1, wherein the digital signature algorithm is combined with the white-box implementation of the symmetric cipher.

10. A method for producing a digital signature, by a white-box cryptographic system, of a message m using a white-box implementation, comprising:

producing, by a white-box cryptographic system, a deterministic nonce value without using hash function by encrypting the message m using a secret key using a white-box implementation of a symmetric cipher; and producing, by a white-box cryptographic system, a digital signature of the message m based upon the deterministic nonce value, the message m, and a secret signing key.

11. The method of claim 10, wherein the digital signature algorithm is an elliptic curve digital signature algorithm as defined in NIST FIPS 186-4.

12. The method of claim 10, wherein the digital signature algorithm is a digital signature algorithm based upon modular exponentiation as defined in NIST FIPS 186-4.

13. The method of claim 10, wherein white-box implementation of the symmetric cipher is a static implementation incorporating the secret key.

14. The method of claim 10, wherein white-box implementation of the symmetric cipher is a dynamic implementation configured to receive the secret key as an input.

15. The method of claim 10, wherein the white-box implementation of the symmetric cipher is bound to a specific platform.

16. The method of claim 10, further comprising generating the secret key randomly off line.

17. The method of claim 10, further comprising deriving the secret key from the secret signing key.

18. The method of claim 10, wherein the digital signature algorithm is combined with the white-box implementation of the symmetric cipher.

* * * * *